UNITED STATES PATENT OFFICE.

FELIX KAUFLER, OF VIENNA, AUSTRIA-HUNGARY, AND AUGUST CHWALA, OF MILAN, ITALY.

METHOD OF PRODUCTION OF ARSENATE OF LEAD.

1,056,340.　　　　Specification of Letters Patent.　　Patented Mar. 18, 1913.

No Drawing.　　　Application filed May 20, 1912. Serial No. 698,583.

*To all whom it may concern:*

Be it known that we, FELIX KAUFLER and AUGUST CHWALA, both subjects of the Emperor of Austria-Hungary, residing at Vienna, Austria-Hungary, and Milan, Italy, respectively, have invented certain new and useful Improvements in the Method of Production of Arsenate of Lead; and we do hereby declare the following to be a full, clear, and exact description of the invention, such as will enable others skilled in the art to which it appertains to make and use the same.

Arsenate of lead has heretofore been manufactured either by dissolving oxid of lead in arsenic acid or by a double decomposition of arsenates with lead salts. The first named method has not yielded satisfactory results, because owing to the formation of lumps a certain part of the oxid of lead remains unattacked, whereas the last named method has proved to be economically unfavorable.

The present invention is based upon the observation that the higher oxids of lead, when being reduced in the presence of arsenic acid and water enter with the latter into reaction smoothly and without giving any waste products and yield as a result arsenate of lead. As a reducing agent it is advantageous to employ arsenious acid which is transformed into arsenic acid, this latter on its part being utilized for the formation of the salt. By calculating the percentages of arsenious acid and arsenic acid in the mixture of reaction, in accordance with the degree of oxidation of the lead (minium or dioxid of lead, as the case may be), more or less basic or acid arsenates of lead are obtained.

Example: 20 kilograms of arsenious acid are oxidized in the known manner so as to form arsenic acid; the obtained acid solution is mixed with 200 kilograms of water, 15.5 kilograms of arsenious acid and 100 kilograms of minium, and the whole mixture is subjected to boiling. After the neutralization of the excess of said arsenate of lead of a nearly neutral reaction is obtained.

We claim:

1. Process of making lead arsenate, which comprises reacting upon a higher oxid of lead with arsenic acid and arsenious acid in the presence of water.

2. Process of making lead arsenate, which comprises reacting upon minium with arsenic acid and arsenious acid in the presence of water.

In testimony that we claim the foregoing as our invention, we have signed our names in presence of two subscribing witnesses.

FELIX KAUFLER.
　　　　　　　　AUGUST CHWALA.

Witnesses for Felix Kaufler:
　　JOSEF RICHARD,
　　ADA MARIA BERGER.
Witnesses for August Chwala:
　　R. CARLO SALVOTU,
　　P. P. DE FRAMIKIS.